US008351622B2

(12) United States Patent
Suzuki et al.

(10) Patent No.: US 8,351,622 B2
(45) Date of Patent: Jan. 8, 2013

(54) AUDIO MIXING DEVICE

(75) Inventors: Ryoji Suzuki, Nara (JP); Kazuyuki Murata, Kyoto (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 12/738,329

(22) PCT Filed: Oct. 20, 2008

(86) PCT No.: PCT/JP2008/002965
§ 371 (c)(1), (2), (4) Date: Apr. 16, 2010

(87) PCT Pub. No.: WO2009/050903
PCT Pub. Date: Apr. 23, 2009

(65) Prior Publication Data

US 2010/0232627 A1 Sep. 16, 2010

(30) Foreign Application Priority Data

Oct. 19, 2007 (JP) ................................ 2007-272133

(51) Int. Cl.
*H04B 1/00* (2006.01)
*H04R 5/00* (2006.01)

(52) U.S. Cl. ......................................... 381/119; 381/23

(58) Field of Classification Search .................. 381/119, 381/23, 22, 17, 19, 1, 300; 700/94; 386/248, 386/339, 340; 704/500
See application file for complete search history.

(56) References Cited

U.S. PATENT DOCUMENTS 5,896,358 A 4/1999 Endoh et al.
6,005,948 A 12/1999 Maeda
6,016,295 A 1/2000 Endoh et al.
6,128,597 A * 10/2000 Kolluru et al. ................ 704/500
7,415,120 B1 * 8/2008 Vaudrey et al. ............... 381/109
7,555,354 B2 * 6/2009 Walsh et al. .................... 700/94

(Continued)

FOREIGN PATENT DOCUMENTS

JP 06-165079 6/1994

(Continued)

OTHER PUBLICATIONS

Search Report for corresponding International Application No. PCT/JP2008/002965 mailed Jan. 27, 2009.

(Continued)

*Primary Examiner* — Hai Phan
(74) *Attorney, Agent, or Firm* — Renner, Otto, Boisselle & Sklar, LLP

(57) ABSTRACT

An audio mixing device that can get simpler processing done safely without depending on the property of an input signal is provided. An audio mixing device includes: an analyzer circuit to receive and separate audio data into primary and secondary audio data and control data; decoder circuits for decoding the primary and supplementary audio data separated into primary and supplementary audio signals in multiple channels; a mixer circuit for generating an M-channel composite audio signal by adding the supplementary audio signals to the primary ones channel-by-channel and converting the M-channel composite audio signal into N-channel audio signals (where N<M) based on a mixing coefficient group set; and a decision circuit, which determines, by parameters included in the control data separated to indicate the existence or non-existence of supplementary audio, whether there is any supplementary audio, no matter whether the supplementary audio data has been separated or not, and chooses, based on the result, one of mixing coefficient groups stored in a coefficient memory circuit and sets it for the mixer circuit.

9 Claims, 4 Drawing Sheets

U.S. PATENT DOCUMENTS

| | | | | |
|---|---|---|---|---|
| 2004/0032960 | A1 | 2/2004 | Griesinger | |
| 2006/0287744 | A1 * | 12/2006 | Kim et al. | 700/94 |
| 2007/0041712 | A1 * | 2/2007 | Kim et al. | 386/95 |
| 2007/0047912 | A1 | 3/2007 | Hattori et al. | |
| 2008/0063369 | A1 * | 3/2008 | Kim et al. | 386/95 |
| 2009/0245539 | A1 * | 10/2009 | Vaudrey et al. | 381/109 |

FOREIGN PATENT DOCUMENTS

| | | |
|---|---|---|
| JP | 09-046799 | 2/1997 |
| JP | 2001-5185267 | 10/2001 |
| JP | 2004-241853 | 8/2004 |
| JP | 2005-523672 | 8/2005 |
| JP | 2007-095249 | 4/2007 |

OTHER PUBLICATIONS

Form PCT/ISA/237 for International Application No. PCT/JP2008/002965 and partial English translation.

Form PCT/IPEA/416/409 for International Application No. PCT/JP2008/002965 and partial English translation.

* cited by examiner

| TITLE TYPE | ANY Sound.bdmv ? | audio_mix_app_flag | ANY Interactive Graphics ? | ANY Secondary Audio ? |
|---|---|---|---|---|
| HDMV(1) | — | 0 | — | — |
| HDMV(2) | NO | 1 | — | NO |
| HDMV(3) | YES | 1 | NO | NO |
| BD-J | — | 0 | — | — |

AUDIO MIXING DEVICE

TECHNICAL FIELD

The present invention relates to an audio mixing device for providing primary audio with either additional secondary audio, which provides audio data associated with the primary audio, or some sound effect representing the user's operation.

BACKGROUND ART

Recently, a content in which audio signals have been recorded in more than two channels has become more and more popular. For example, a movie content, in which audio signals have been recorded in six channels, is now available on a DVD.

Audio signals are usually supposed to be output through the same number of loudspeakers as their number of channels. For example, FIG. 1 illustrates a set of loudspeakers 11 through 16, which are arranged so as to surround a listener 17 and output six-channel audio signals. Specifically, a left channel (L) loudspeaker 11, a center channel (C) loudspeaker 12, a right channel (R) loudspeaker 13, a left surround channel (LS) loudspeaker 14, a right surround channel (RS) loudspeaker 15 and a low frequency effect (LFE) channel loudspeaker 16 are illustrated in FIG. 1.

The frequency range of the audio signal output through the LFE channel loudspeaker 16 is one tenth or less of those of the audio signals output through the other loudspeakers. And the LFE audio signal is sometimes counted as a "0.1 channel" audio signal. That is why the loudspeaker system shown in FIG. 1 is often called a "5.1 channel surround loudspeaker system". In this description, however, the LFE audio signal is also counted as a one channel audio signal and the term "5.1 channel" will not be used herein.

When a content with six channel audio signals is broadcast as a TV program, the broadcaster sometimes converts the six channel audio signals into two channel audio signals before transmitting the program. This is done because the broadcaster wants that program to be viewed and listened to on an analog TV set with only two loudspeakers. Such processing for decreasing the number of channels of the audio signals is called "down mixing". A TV set with two loudspeakers can output audio through its two loudspeakers based on the two-channel audio signals received.

Meanwhile, there are audio devices with more than two loudspeakers. The larger the number of loudspeakers through which the audio can be output, the greater the degree of existence added to the video. That is why the audio is preferably output through as many loudspeakers as possible independently of each other. For that reason, it has become more and more commonplace that a device that has received two-channel audio signals performs pseudo surround processing for generating pseudo channel data in more than two channels according to its own output performance.

A normal down mixing method is represented by the following Equations (1) and (2):

$$Ldm=KLL\times Lm+KLC\times Cm+KLR\times Rm+KLLS\times LSm+KLRS\times RSm+KLLFE\times LFEm \quad (1)$$

$$Rdm=KRL\times Lm\times KRC\times Cm+KRR\times Rm+KRLS\times LSm+KRRS\times RSm+KRLFE\times LFEm \quad (2)$$

In Equations (1) and (2), Ldm denotes a left output signal generated, Rdm denotes a right output signal generated, Cm, Lm and Rm denote the center, left and right signals of the original audio signals, LSm and RSm denote left surround and right surround signals of the original audio signals, and LFEm denotes the low frequency effect signal of the original audio signals. By these Equations (1) and (2), six-channel audio signals (i.e., M=6) are down-mixed into two-channel audio signals (i.e., N=2). On receiving the left and right output signals Ldm and Rdm, a TV set with two loudspeakers outputs these audio signals through the respective loudspeakers.

The coefficients by which Cm, Lm, Rm, LSm, RSm and LFEm are multiplied in Equations (1) and (2) are as follows. The coefficients (A1) are called "left mixing coefficients" and the coefficients (A2) are called "right mixing coefficients".

(A1): KLL=1.0, KLC=0.707, KLR=0.0, KLLS=−0.707, KLRS=−0.707, and KLLFE=0.0, (A2): KRL=0.0, KRC=0.707, KRR=1.0, KRLS=0.707, KRRS=0.707, and KRLFE=0.0, The mixing coefficients are set to be these values in order to obtain a pseudo surround channel signal and a pseudo center channel signal as represented by the following Equations (3) and (4):

$$Rdm-Ldm=-Lm+Rm+1.414\times(LSm+RSm) \quad (3)$$

$$Rdm+Ldm=Lm+1.414\times Cm+Rm \quad (4)$$

According to Equation (3), the device that has received the left and right output signals Ldm and Rdm can obtain a pseudo boosted surround channel signal (LSm+RSm) by subtracting Ldm from Rdm. On the other hand, according to Equation (4), the device that has received the left and right output signals Ldm and Rdm can obtain a pseudo boosted center channel signal (Cm) by adding Ldm to Rdm. That is to say, by making the simple calculations by these Equations (3) and (4), the device can generate a pseudo center channel signal and a pseudo surround channel signal based on the two-channel output signals Ldm and Rdm and can eventually reproduce audio in four channels in total.

Patent Documents Nos. 1 to 3 disclose a technique for changing the settings of coefficients (or parameters) to be used for a down-mixing audio mixing device to down-mix six-channel audio signals into two-channel audio signals.

On the other hand, Patent Document No. 4 discloses an audio mixing device that maintains a predetermined multi-channel mixing direction and signal energy. According to this document, multi-channel input signals are down-mixed into output signals in response to left and right channel mixing coefficients ml and mr generated so that the signal energy and predetermined direction of the input signal are substantially maintained in the output signal.

Patent Document No. 1: Japanese Patent Application Laid-Open Publication No. 6-165079

Patent Document No. 2: Japanese Patent Application Laid-Open Publication No. 2004-241853

Patent Document No. 3: PCT International Application Japanese National Phase Publication No. 2001-518267

Patent Document No. 4: PCT International Application Japanese National Phase Publication No. 2005-523672

DISCLOSURE OF INVENTION

Problems to be Solved by the Invention

However, if two-channel (N=2) audio signals Ldm and Rdm are generated by using the mixing coefficients of Equations (1) and (2), the acoustic image of the two-channel audio signals could be totally different from that of the original six-channel (M=6) signals.

For example, to get the acoustic image oriented at the position of the listener 17 in the six-channel loudspeaker system shown in FIG. 1, a signal with an amplitude of 0.5 may be output from the C channel and signals with an amplitude of 0.25 may be output from the RS and LS channels. If those audio signals are down-mixed into two channel signals, the output signals represented by the following Equations (5) and (6) are obtained (by substituting Cm=0.5 and LSm=RSm=0.25 for Equations (1) and (2)):

$$Ldm=0.0+0.707\times0.5-0.707\times0.25-0.707\times0.25=0.0 \quad (5)$$

$$Rdm=0.707\times0.5+0.0+0.707\times0.25+0.707\times0.25=0.707 \quad (6)$$

As can be seen easily from Equation (5), the left output signal Ldm produces no audio at all. As a result, the device that has received the down-mixed output signals Ldm and Rdm will output audio, of which the acoustic image is biased to the right.

Such an unnatural acoustic image is immediately recognized particularly when secondary audio signals and sound effect signal acoustic image, included in six-channel audio signals, are moved through a number of channels by panning, for example. As used herein, the "panning" refers to an audio output method for rotating the acoustic image clockwise along the circle shown in FIG. 1 by outputting the audio through the L, C, R, RS, and LS loudspeakers 11, 12, 13, 15 and 14 in this order as shown in FIG. 1.

On top of that, according to Patent Documents Nos. 1 to 3, the settings of those parameters are changed in order to adjust the sound quality to the user's taste or to achieve the best sound quality ever according to the program source. However, this method lacks flexibility because the settings need to be determined in advance or the contents of the program source need to be known beforehand.

Meanwhile, according to Patent Document No. 4, the mixing coefficients ml and mr should be calculated based on the energy of the input signal, and therefore, the audio mixing device requires either a bigger hardware size or more complicated software processing, thus increasing the overall cost. To realize a similar function in a consumer electronic device, there is an increasing demand for a method that requires simpler processing and that does not depend on the property of the input signal such as its energy unlike the technique disclosed in Patent Document No. 4.

On top of that, the audio mixing devices disclosed in Patent Documents Nos. 2 and 3 are supposed to be built in a DVD player and cannot be applied to a Blu-ray Disc (BD) player of the next generation. According to the Blu-ray Disc Format, button sounds (i.e., supplementary audio) are defined to be readily mixed with the primary audio, and therefore, the acoustic image should be easily movable by panning the supplementary audio signals. However, sometimes those supplementary audio signals are not accompanied with video, and therefore, video information cannot always be used complementarily to get the acoustic image oriented. That is why a product compliant with the Blu-ray Disc Format should be able to maintain, in one way or another, the acoustic image orientation of supplementary audio signals, if any, even when mixing is done.

It is therefore an object of the present invention to provide an audio mixing device that can get simpler processing done safely without depending on the property of the input signal.

Means for Solving the Problems

An audio mixing device according to the present invention includes: an analyzer circuit, which receives input audio data, including primary audio data, supplementary audio data and control data, and which separates the input audio data into the respective kinds of data, the control data including multiple parameters indicating whether or not any supplementary audio is included; a primary audio decoder circuit for decoding the primary audio data separated into primary audio signals in multiple channels; a supplementary audio decoder circuit for decoding the supplementary audio data separated into supplementary audio signals in multiple channels; a mixer circuit for generating an M-channel composite audio signal by adding the supplementary audio signals to the primary audio signals on a channel-by-channel basis and for converting the M-channel composite audio signal into N-channel audio signals (where N<M) based on a group of mixing coefficients set; a coefficient memory circuit for storing multiple groups of mixing coefficients that have been set for the mixer circuit; and a decision circuit, which determines, by the respective parameters included in the control data separated, whether or not any supplementary audio is included, no matter whether the supplementary audio data has been separated or not, and chooses, based on a result of the decision, one of the multiple groups of mixing coefficients that are stored in the coefficient memory circuit and sets that group of mixing coefficients for the mixer circuit.

The supplementary audio may be at least one of secondary audio and sound effect and each of the multiple parameters may indicate whether or not any secondary audio or sound effect is included. If each parameter indicates that no secondary audio or sound effect is included, the decision circuit may decide that no supplementary audio be included.

The supplementary audio may be at least one of secondary audio and sound effect. The multiple parameters may include: a parameter indicating whether or not any file that stores the sound effect is included; a flag indicating whether or not the supplementary audio is included; a parameter indicating whether or not any interactive graphics is included; and a parameter indicating whether or not the secondary audio data is included in the supplementary audio. The decision circuit may decide that no supplementary audio be included (a) if the flag indicating whether or not the supplementary audio is included denies the existence of the supplementary audio; or (b) if the flag indicating whether or not the supplementary audio is included confirms the existence of the supplementary audio, and if the parameter indicating whether or not any secondary audio data is included denies the existence of the secondary audio data, and if the parameter indicating whether or not any interactive graphics is included denies the existence of the interactive graphics; or (c) if the flag indicating whether or not the supplementary audio is included confirms the existence of the supplementary audio, and if the parameter indicating whether or not any secondary audio data is included denies the existence of the secondary audio data, and if the parameter indicating whether or not any interactive graphics is included denies the existence of the interactive graphics, and if the parameter indicating whether or not any file that stores the sound effect is included denies the existence of the sound effect.

If the parameter indicating whether or not any interactive graphics is included denies the existence of the interactive graphics, the decision circuit may decide that no sound effect be included. But if the parameter indicating whether or not the interactive graphics is included confirms the existence of the interactive graphics, the decision circuit may decide that the sound effect be included.

The supplementary audio may be at least one of secondary audio and sound effect. The multiple parameters may include at least one of: a parameter indicating whether or not any file that stores the sound effect is included; a flag indicating whether or not the supplementary audio is included; a parameter indicating whether or not any interactive graphics is included; and a parameter indicating whether or not the secondary audio data is included in the supplementary audio. If each parameter indicates that no secondary audio or sound effect is included, the decision circuit may decide that no supplementary audio be included.

When the analyzer circuit receives the audio data for the first time since the device has been turned ON, the decision section may set the group of mixing coefficients for the mixer circuit.

When the analyzer circuit newly receives another audio data, the decision circuit may set the group of mixing coefficients for the mixer circuit.

Effects of the Invention

In the audio mixing device of the present invention, if the decision circuit decides, based on the control data provided by the analyzer circuit, that supplementary audio data be included in the input data, the decision circuit retrieves mixing coefficients for use in a situation where supplementary audio data is included from the coefficient memory circuit, and sets those coefficients for the mixer circuit. Otherwise, the decision circuit retrieves mixing coefficients for use in a situation where no supplementary audio data is included from the coefficient memory circuit, and sets those coefficients for the mixer circuit. Since the decision circuit can make a decision based on the control data included in the input data, the processing can be simplified. And if any supplementary audio is included, mixing coefficients are retrieved from the coefficient memory circuit with the directivity maintained. In this manner, an output audio signal in which the primary audio and the supplementary audio are mixed together can be obtained with the acoustic image orientation maintained just as intended.

On top of that, the decision circuit determines, based on the control data provided by the analyzer circuit, not the input signal itself, whether or not any supplementary audio data is included in the input data. For that reason, even if the property of the input signal changed suddenly, the mixer circuit could still continue its mixing consistently and safely without being affected by such a change.

DESCRIPTION OF REFERENCE NUMERALS

Figure 1:
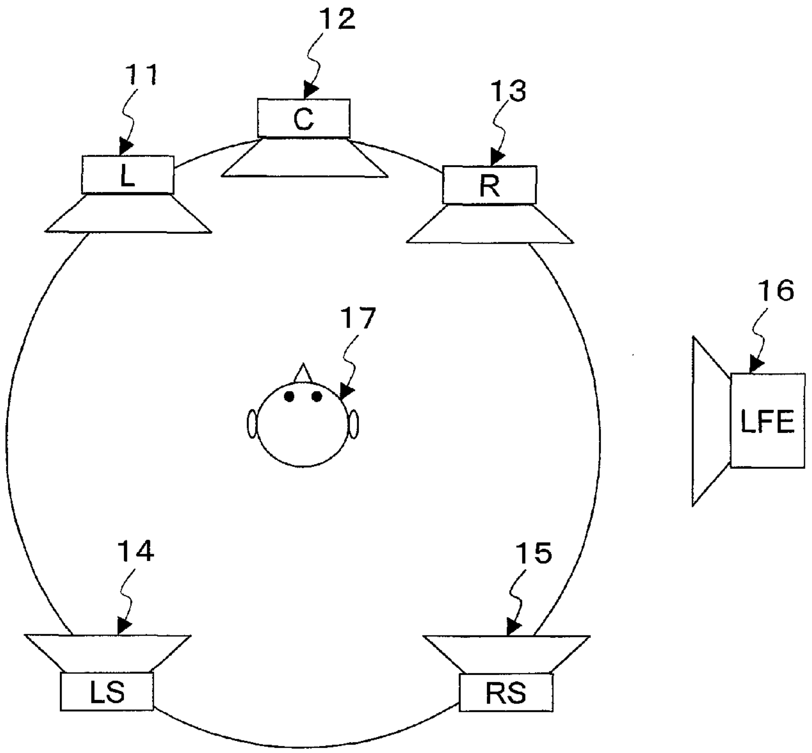
FIG. 1 CONVENTIONAL ART
FIG. 1 illustrates a set of loudspeakers 11 through 16, which are arranged so as to surround a listener 17 and output six-channel audio signals.

101 analyzer circuit
102 decision circuit
103 primary audio decoder circuit
104 secondary audio decoder circuit
105 sound effect decoder circuit
106 secondary audio adder circuit
107 sound effect adder circuit
108 coefficient memory circuit
109 mixer circuit
110 adder circuit
111 supplementary audio decoder circuit

BEST MODE FOR CARRYING OUT THE INVENTION

Hereinafter, preferred embodiments of an audio mixing device according to the present invention will be described with reference to the accompanying drawings.

Figure 2:
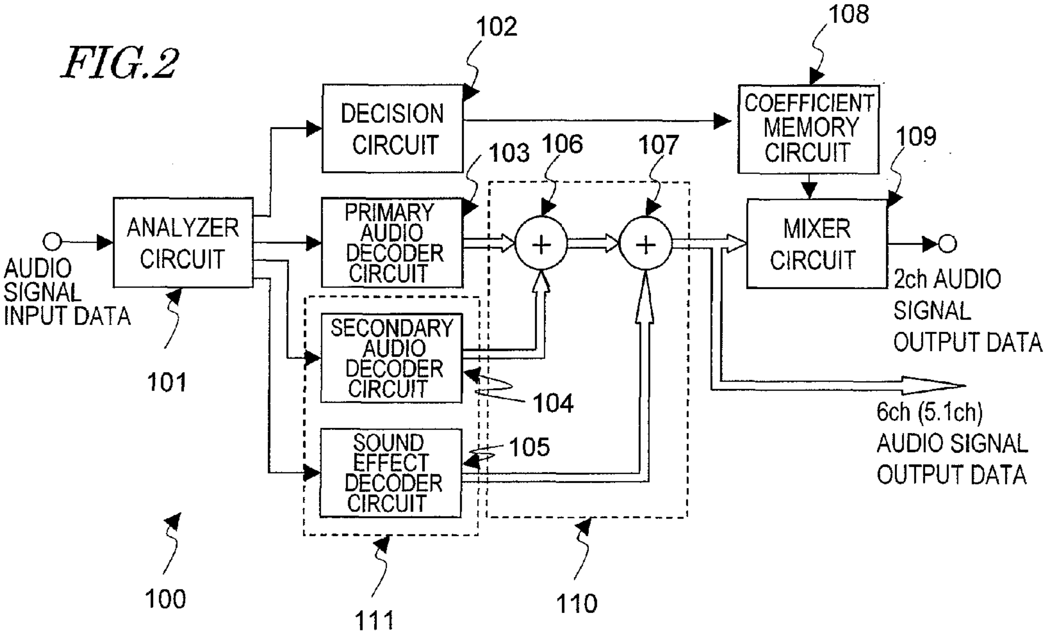
FIG. 2 is a block diagram illustrating an audio mixing device 100 as a preferred embodiment of the present invention.

FIG. 2 is a block diagram illustrating an audio mixing device 100 as a preferred embodiment of the present invention. The audio mixing device 100 includes an analyzer circuit 101, a decision circuit 102, a primary audio decoder circuit 103, a coefficient memory circuit 108, a mixer circuit 109, an adder circuit 110, and a supplementary audio decoder circuit 111.

The analyzer circuit 101 receives audio data, in which primary audio data, at least one kind of supplementary audio data, and control data are superposed one upon the other. The analyzer circuit 101 separates the audio data received into primary audio data, supplementary audio data and control data.

It should be noted that “secondary audio” generally refers to supplementary audio that accompanies primary audio and “sound effect” normally refers to audio that represents the user’s operation. As for the audio of a movie, for example, the “primary audio data” is data representing the primary audio of the movie content itself, the “secondary audio data” is data representing secondary audio including dubbing in a different language or the commentary left by the movie staff, and the “sound effect data” is data representing sound effect to be produced when some item on the menu displayed is selected or entered.

The audio data may have been written on a Blu-ray Disc and then read by a BD player (not shown), for example. Supposing this audio data was written in the form of a transport stream, the audio data consists of a number of packets. By reference to mutually different identifiers assigned to respective packets that store the primary audio data, the supplementary audio data (including secondary audio data and sound effect data) and the control data (which will be referred to herein as “packet IDs (PIDS)”), the analyzer circuit 101 separates the input audio data into the respective kinds of data.

The decision circuit 102 determines, by reference to the control data supplied from the analyzer circuit 101, whether or not the supplementary audio data is included. And based on the result of the decision, the decision circuit 102 chooses one of multiple groups of mixing coefficients that are stored in the coefficient memory circuit 108 (to be described later) and sets that group of mixing coefficients for the mixer circuit 109. The function of the decision circuit 102 is performed by getting a computer program, which is stored in a memory (not shown), executed by a central processing unit (CPU) that is a computer. Such a computer program is defined so as to perform the processing procedure shown in FIG. 6 as will be described later.

The primary audio decoder circuit 103 decodes the primary audio data into a primary audio signal in at least one channel. On the other hand, the supplementary audio decoder circuit 111 includes a secondary audio decoder circuit 104 and a sound effect decoder circuit 105 and decodes the supplementary audio data into a supplementary audio signal in at least one channel.

The adder circuit 110 includes a secondary audio adder circuit 106 and a sound effect adder circuit 107 and adds at least one supplementary audio signal to the primary audio signal. In FIG. 2, only one adder circuit 110 is illustrated. However, multiple adder circuits 110 may be provided, too. With multiple adder circuits 110 provided, even if the secondary audio signal has a lot of channels, the processing can still get done quickly.

The coefficient memory circuit 108 stores multiple sets of mixing coefficients to be used for the mixer circuit 109 to convert M-channel signals into N-channel signals. For example, the coefficient memory circuit 108 may store a group of mixing coefficients (A1) and (A2) for use in Equations (1) and (2) described above (which group will be referred to herein as a "mixing coefficient group (A)"). In addition, the coefficient memory circuit 108 may also store another group of mixing coefficients (B1) and (B2) for use in Equations (7) and (8) to be described later (which group will be referred to herein as a "mixing coefficient group (B)"). In accordance with the instruction given by the decision circuit 102, the coefficient memory circuit 108 selectively outputs either the mixing coefficient group (A) or the mixing coefficient group (B).

The mixer circuit 109 converts the M-channel primary audio signals, to which at least one supplementary audio signal has been added, into N-channel signals (where N<M). For example, the mixer circuit 109 performs down mixing on the input six-channel audio signals based on the mixing coefficients, thereby outputting two-channel audio signals.

Optionally, the audio mixing device 100 could output the six-channel signals, which are supposed to be input to the mixer circuit 109, without passing the signals through the mixer circuit 109.

Figure 3:
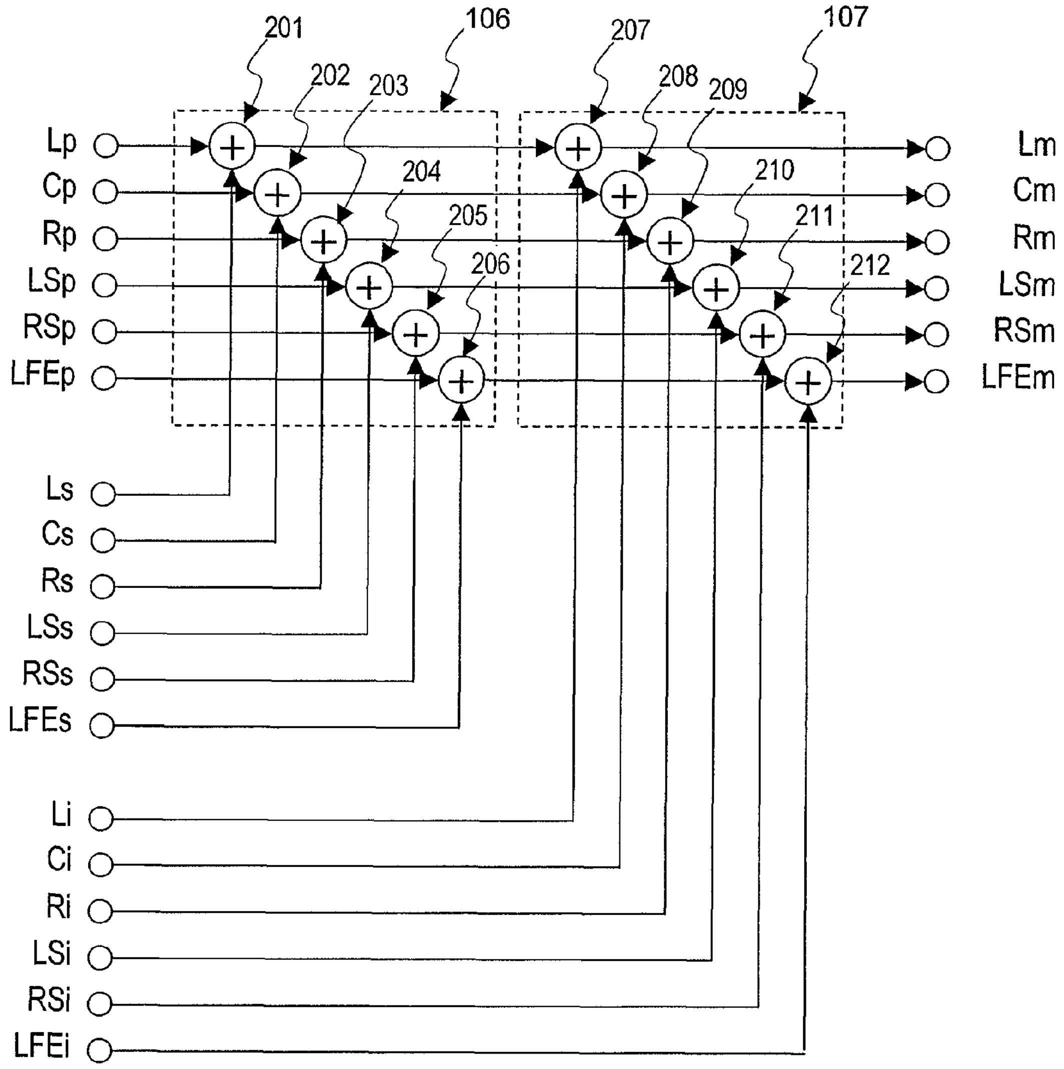
FIG. 3 is a block diagram illustrating a detailed configuration for the adder circuit 110 shown in FIG. 2.

FIG. 3 is a block diagram illustrating a detailed configuration for the adder circuit 110 shown in FIG. 2. In this adder circuit 110, the secondary audio adder circuit 106 includes six adder circuits 201 to 206 for the respective channels. The adder circuits 201 to 206 add together six-channel primary audio signals (Lp, Cp, Rp, LSp, RSp, LFEp) and six-channel secondary audio signals (Ls, Cs, Rs, LSs, RSs, LFEs).

The sound effect adder circuit 107 also includes adder circuits 207 to 212 for the respective channels. The adder circuits 207 to 212 add together the six-channel audio signals, in which primary audio and secondary audio have been combined together as a result of the addition processing by the secondary audio adder circuit 106, and six-channel sound effect signals (Li, Ci, Ri, LSi, RSi, LFEi). Consequently, the sound effect adder circuit 107 outputs six-channel audio signals (Lm, Cm, Rm, LSm, RSm, LFEm) in which the primary audio, secondary audio and sound effect have been combined together.

These signs L, C, R, LS, RS and LFE, to which the subscripts p, s, i and m are added, stand for the same channels as what has already been described for the background with reference to FIG. 1.

Figures 4, 5:
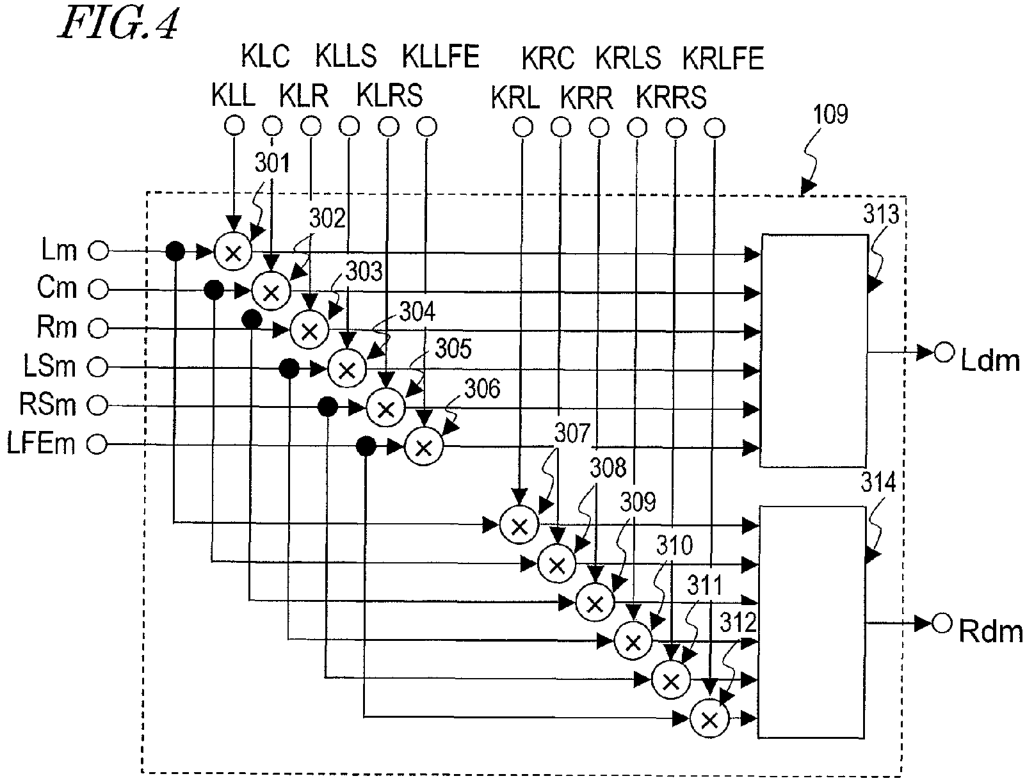
FIG. 4 is a block diagram illustrating a detailed configuration for the mixer circuit 109 shown in FIG. 2.
FIG. 5 shows on what conditions the decision circuit 102 decides that no secondary audio or sound effect be included.

FIG. 4 is a block diagram illustrating a detailed configuration for the mixer circuit 109 shown in FIG. 2. The mixer circuit 109 includes left channel multipliers 301 to 306, right channel multipliers 307 to 312, a left channel adder circuit 313 and a right channel adder circuit 314.

The left-channel multipliers 301 to 306 multiply the respective channels Lm, Cm, Rm, LSm, RSm and LFEm in the output audio signal of the sound effect adder circuit 107 of the adder circuit 110 (see FIG. 3) by left mixing coefficients (KLL, KLC, KLR, KLLS, KLRS, KLLFE), respectively. The right-channel multipliers 307 to 312 multiply the respective channels Lm, Cm, Rm, LSm, RSm and LFEm in the output audio signal of the sound effect adder circuit 107 by right mixing coefficients (KRL, KRC, KRR, KRLS, KRRS, KRLFE), respectively.

The left and right mixing coefficients to be used for the left- and right-channel multipliers 301 to 306 and 307 to 312 for multiplication purposes can be changed externally. As will be described later, these mixing coefficients are stored in the coefficient memory circuit 108 and are changed in accordance with the instruction given by the decision circuit 102.

The left channel adder circuit 313 calculates the sum of the signals on respective channels that have been multiplied by the left mixing coefficients. The right channel adder circuit 314 calculates the sum of the signals on respective channels that have been multiplied by the right mixing coefficients. As a result, the mixer circuit 109 outputs an audio signal in two channels Ldm and Rdm. In this manner, the six-channel (M=6) signals can be down-mixed into such two-channel (N=2) signals.

Hereinafter, it will be described how the audio mixing device 100 (see FIG. 2) operates. In the example described above, the number of channels is supposed to be six. However, in the example to be described below, the number of channels is supposed to be M to describe the present invention more generally. And if the number of channels is smaller than M, a signal with a signal value of zero is supposed to be output. In this manner, computation processing is carried out on the M channels.

The analyzer circuit 101 receives the input audio data and separates the audio data into primary audio data, supplementary audio and control data. As described above, the supplementary audio data includes secondary data and sound effect data. The analyzer circuit 101 also separates the supplementary audio data into the secondary data and the sound effect data.

The primary audio decoder circuit 103 decodes the primary audio data into a primary audio signal in at most M channels. Meanwhile, the secondary audio decoder circuit 104 decodes the secondary audio data into a secondary audio signal in at most M channels. And the sound effect decoder circuit 105 decodes the sound effect data into a sound effect signal in at most M channels.

Next, the secondary audio adder circuit 106 adds the M-channel secondary audio signals supplied from the secondary audio decoder circuit 104 to the M-channel primary audio signals supplied from the primary audio decoder circuit 103. This addition is made between each pair of associated channels of theirs. On the other hand, the sound effect adder circuit 107 adds the M-channel sound effect signals supplied from the sound effect decoder circuit 105 to the M-channel primary audio signals supplied from the secondary audio adder circuit 106 after the secondary audio has been added thereto. This addition is also made between each pair of associated channels of theirs.

Meanwhile, in parallel with the processing described above, the decision circuit 102 determines, based on the control data that has been separated and provided by the analyzer circuit 101, whether or not any secondary audio data or sound effect data is included in the input data. In the coefficient memory circuit 108, stored are the mixing coefficient group A for use in a situation where no secondary audio data or sound effect data is included and the mixing coefficient group B for use in a situation where the secondary audio data or sound effect data is included in the input data. Based on the result of the decision, the decision circuit 102 chooses one of the mixing coefficient groups A and B that are stored in the coefficient memory circuit 108 and instructs the coefficient memory circuit 108 to output the chosen one to the mixer circuit 109. As a result, one of these two mixing coefficient groups is set for the mixer circuit 109. Thus, it can be said that the decision circuit 102 chooses one of the two mixing coefficient groups A and B based on the decision result and sets it for the mixer circuit 109.

The mixer circuit 109 converts the M-channel audio signals supplied from the sound effect adder circuit 107 into signals in N channels, which are smaller in number than M channels (i.e., N<M), using the mixing coefficients that are stored in the coefficient memory circuit 108.

Multiple groups of mixing coefficients could be set for the mixer circuit 109. One of them is the mixing coefficient group A that is used to carry out the calculations represented by Equations (1) and (2). Again the mixing coefficient group A is:

(A1) KLL=1.0, KLC=0.707, KLR=0.0, KLLS=−0.707, KLRS=−0.707, and KLLFE=0.0

(A2) KRL=0.0, KRC=0.707, KRR=1.0, KLLS=0.707, KLRS=0.707, and KLLFE=0.0

With this mixing coefficient group A alone, however, the N-channel acoustic image produced by down mixing could be totally different from that of the original M-channel signals. Thus, according to this preferred embodiment, another mixing coefficient group B is provided in addition to the mixing coefficient group A and one of these two mixing coefficient groups A and B is chosen and set for the mixer circuit 109.

The condition set in this preferred embodiment is whether or not any secondary audio data or sound effect data is included in the input data. It should be noted that if the secondary audio data and the sound effect data are both included, the processing is advanced with that condition supposed to be met because the secondary audio data is included in the input data. That kind of processing will be described in detail later with reference to FIG. 6.

As far as a BD is concerned, the acoustic image of a secondary audio signal or a sound effect signal can be moved through a number of channels. That is why if any secondary audio data or sound effect data is included in the input data, such movement of the acoustic image is expected. For that reason, if the acoustic image of the secondary audio signal or sound effect signal should be moved through a number of channels, down mixing needs to be carried out using such mixing coefficients that will not produce an unnatural acoustic image easily.

For example, if the number N of channels after the down mixing is two, then those two channels do not include center (C), left surround (LS) and right surround (RS) channels. As for the audio signals in such channels of the M channels (where M=6) that are not included in the N channels (where N=2), those audio signals are added in the same phase to at least one of the N channels that is located at the longest distance. And mixing coefficients that are required to get such calculations done need to be set. As a result, even if the M-channel signals are mixed into N channels, the acoustic image orientation can still be maintained as well as possible.

The following Equations (7) and (8) represent how to down-mix six-channel input data into two channels in a situation where secondary audio data or sound effect data is included in the six-channel input data:

$$Ldm' = Lm + 0.707 \times Cm + 0.707 \times LSm \tag{7}$$

$$Rdm' = 0.707 \times Cm + Rm + 0.707 \times RSm \tag{8}$$

The following mixing coefficients B1 and B2 may be used in Equations (7) and (8):

(B1) KLL=1.0, KLC=0.707, KLR=0.0, KLLS=0.707, KLRS=0.0, and KLLFE=0.0

(B2) KRL=0.0, KRC=0.707, KRR=1.0, KLLS=0.0, KLRS=0.707, and KLLFE=0.0

In Equation (7), the left (L) channel signal Lm, 0.707×Cm (i.e., the center (C) channel signal Cm multiplied by the mixing coefficient), and 0.707×LSm (i.e., the left surround (LS) channel signal LSm multiplied by the mixing coefficient) are added (or mixed) together. As a result, a left output signal Ldm' can be obtained.

On the other hand, in Equation (8), 0.707×Cm (i.e., the center (C) channel signal Cm multiplied by the mixing coefficient), the right (R) channel signal Rm and 0.707×RSm (i.e., the right surround (LS) channel signal RSm multiplied by the mixing coefficient) are added (or mixed) together. As a result, a right output signal Rdm' can be obtained.

This mixing coefficient group B (including B1 and B2) is input to the mixing circuit 109 shown in FIG. 4.

It should be noted that if no secondary audio data or sound effect data is included, then there is no need to consider the chances of occurrence of such an unnatural acoustic image. Thus, in that case, just the down mixing represented by Equations (1) and (2) has to be done as in the prior art.

Hereinafter, it will be described in detail with reference to FIGS. 5 and 6 how the decision circuit 102 operates.

First of all, FIG. 5 shows on what conditions the decision circuit 102 decides that no secondary audio or sound effect be included.

Now it will be described how to read the data shown in FIG. 5. “Sound.bdmv”, “audio_mix_app_flag”, “Interactive Graphics” and “Secondary Audio” shown on the top row of FIG. 5 are parameters defined by the Blu-ray Disc Format.

On the top row, “Any Sound.bdmv?” indicates whether or not any sound effect storage file (Sound.bdmv) is included. This file stores audio data information about “interactive graphics stream application” or “BD-J application” as defined by the Blu-ray Disc Format. In this case, HDMV(1) says “indefinite”, HDMV(2) says “No”, HDMV(3) says “Yes” and HDMV(4) says “indefinite” from top to bottom of this column.

The next “audio_mix_app_flag” is also called a “supplementary audio existence flag”, which indicates whether or not the secondary audio mixing and/or the interactive audio mixing are/is applied to PlayList. As used herein, “PlayList” is a piece of information that defines the order in which part or all of at least one moving picture stream is presented. If the secondary audio mixing and/or the interactive audio mixing are/is reproduced synchronously with the video being played back in accordance with the Playlist, the flag is set to be one. Otherwise, the flag is set to be zero. If the flag is zero, then it means that no secondary audio or sound effect is included, either.

Next, “Any Interactive Graphics?” indicates whether or not any interactive graphics (such as bonus video) is included. In this case, the answers are “indefinite”, “indefinite”, “No” and “indefinite”, respectively, from top to bottom of the column.

Finally, “Any Secondary Audio?” indicates whether or not the supplementary audio includes any substantive data as secondary audio.

As can be seen easily from the foregoing description, each of “Sound.bdmv”, “audio_mix_app_flag” and “Secondary Audio” indicates whether or not any supplementary audio is included. On the other hand, “Interactive Graphics” does not directly indicate whether or not any supplementary audio is included. However, it can be said that its parameter suggests the existence of supplementary audio. This is because if there is any interactive graphics, then it is expected that there would be some accompanying sound effect in most cases: That is why according to this preferred embodiment, all of "Sound.bdmv", "audio_mix_app_flag", "Interactive Graphics" and "Secondary Audio" are regarded as parameters indicating whether or not any supplementary audio is included.

The answers to these queries "Any Sound.bdmv?", "Is audio_mix_app_flag zero or one?", "Any Interactive Graphics?" and "Secondary Audio?" are decided based on the control data that has been separated by the analyzer circuit 101. That is why the respective parameters can be determined by reference to the control data. It should be noted that these parameters are defined by the Blu-ray Disc Format and provided for mutually different purposes. That is to say, these parameters are not associated with each other but are set independently of each other.

Hereinafter, it will be described how the decision circuit 102 determines the mixing coefficients.

Figure 6:
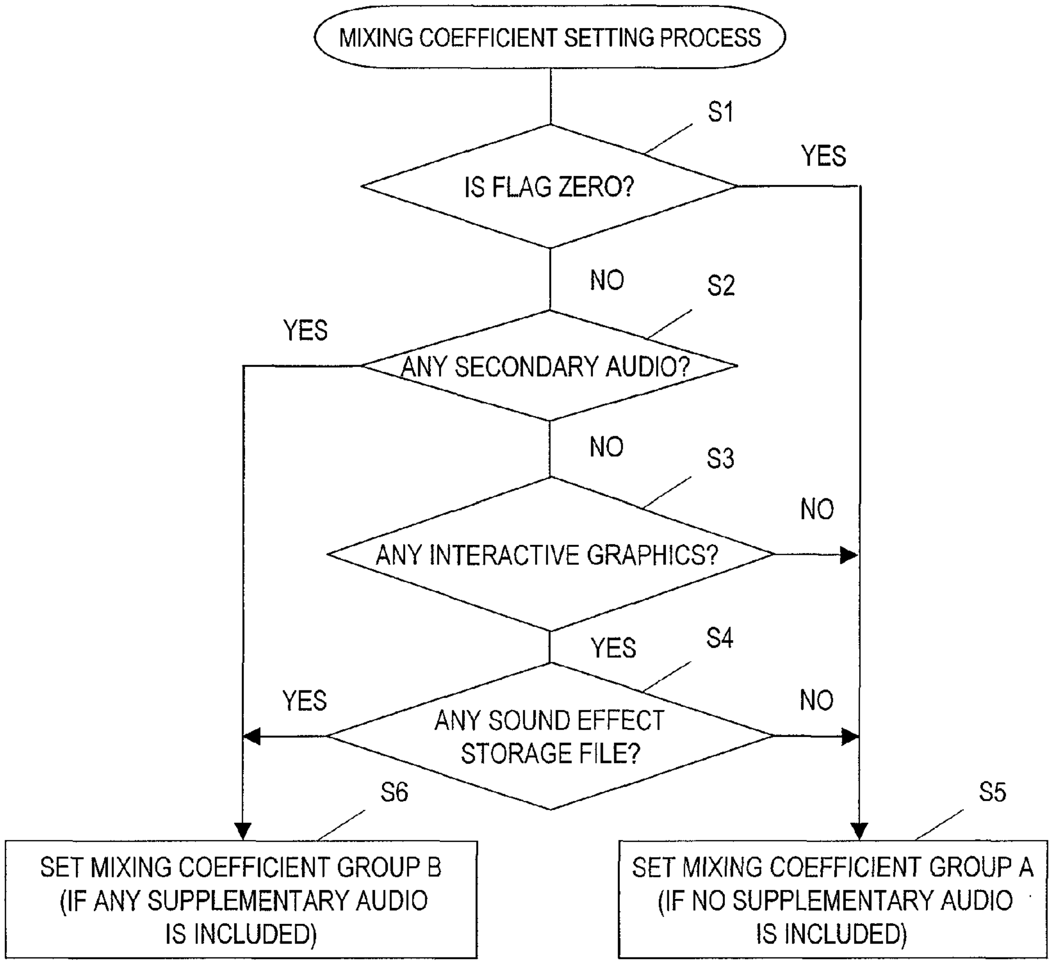
FIG. 6 is a flowchart showing the procedure of the decision process carried out by the decision circuit 102.

First of all, based on the control data that has been separated by the analyzer circuit 101, the decision circuit 102 makes the decision shown in FIG. 6 to determine whether the input audio data includes any secondary audio data or sound effect data or includes neither secondary audio data nor sound effect data.

FIG. 6 shows the procedure of the decision process carried out by the decision circuit 102.

First, in Step S1, the decision circuit 102 determines, by reference to the audio_mix_app_flag, whether or not the supplementary audio existence flag is zero. If the flag is zero (i.e., if no secondary audio or sound effect is included), the process advances to Step S5. On the other hand, if the flag is one, then the process advances to Step S2. In the example illustrated in FIG. 5, the process advances to Step S5 for HDMV(1) and BD-J but to Step S2 for HDMV(2) and HDMV(3), respectively.

In Step S2, the decision circuit 102 determines, by reference to "Any Secondary Audio?", whether or not any secondary audio is included. If there is no secondary audio (i.e., if the answer to the query of the processing step S2 is NO), the process advances to Step S3. Otherwise, (i.e., if the answer to the query of the processing step S2 is YES), the process advances to Step S6.

In the example illustrated in FIG. 5, the answers to the query of this processing step S2 are as follows. First of all, since it is clearly indicated that no secondary audio is included in HDMV(2) and HDMV(3), the process advances to Step S3. As for HDMV(1) and BD-J, on the other hand, the process advances to Step S6. It is supposed to be "indefinite" whether or not there is any secondary audio in HDMV(1) and BD-J. "Indefinite" does not clearly indicate that no secondary audio is included, and therefore, secondary audio is supposed to exist according to this preferred embodiment.

In Step S3, the decision circuit 102 determines, by reference to "Any Interactive Graphics?", whether or not any interactive graphics is included. If there is no interactive graphics (i.e., if the answer to the query of the processing step S3 is NO), the process advances to Step S5. Otherwise, (i.e., if the answer to the query of the processing step S3 is YES), the process advances to Step S4. It is appropriate to perform such a processing step of determining whether or not there is any interactive graphics as a criterion for determining the mixing coefficients. This is because if there is any interactive graphics, it can be expected that some sound effect would be included as described above. As a result, it is possible to avoid safely the generation of an unnatural acoustic image even if the sound effect has been subjected to panning.

In the example illustrated in FIG. 5, the answers to the query of this processing step S3 are as follows. First of all, since it is clearly indicated that no interactive graphics is included in HDMV(3), the process advances to Step S5. In that case, the decision circuit 102 decides that no secondary audio or sound effect be included in HDMV(3). As for HDMV(1), HDMV(2) and BD-J, on the other hand, the process advances to Step S4. This is because "Indefinite" does not clearly indicate that no interactive graphics is included as in the example described above.

In Step S4, the decision circuit 102 determines, by reference to "Any Sound.bdmv?", whether or not any sound effect storage file is included. If there are no such files (i.e., if the answer to the query of the processing step S4 is NO), the process advances to Step S5. Otherwise, (i.e., if the answer to the query of the processing step S4 is YES), the process advances to Step S6.

In the example illustrated in FIG. 5, the answers to the query of this processing step S4 are as follows. First of all, since it is clearly indicated that no sound effect storage file is included in HDMV(2), the process advances to Step S5. As for HDMV(1), HDMV(3) and BD-J, on the other hand, the process advances to Step S6 for the same reason as what has already been described.

In Step S5, the decision circuit 102 instructs the coefficient memory circuit 108 to output the mixing coefficient group for use to carry out the calculations represented by Equations (1) and (2). If the decision circuit 102 has decided in Step S4 that no secondary audio or sound effect be included in HDMV(3), for example, then the decision circuit 102 instructs the coefficient memory circuit 108 to output the mixing coefficient group A described above. As a result, the mixing coefficient group A is set for the mixer circuit 109, which performs down mixing based on Equations (1) and (2) in response.

In Step S6, on the other hand, the decision circuit 102 instructs the coefficient memory circuit 108 to output the mixing coefficient group B described above. As a result, the mixing coefficient group B is set for the mixer circuit 109, which performs down mixing based on Equations (7) and (8) in response.

The decision processing step described above may be carried out at the start of playback of a content (such as a Movie) from a BD, for example. As used herein, the "start of playback" refers to either a point in time when, if the audio mixing device 100 is built in a BD player, the analyzer circuit 101 receives the first audio data ever that has been read from the BD after the BD player and the audio mixing device 100 have been turned ON or a point in time when the analyzer circuit 101 receives the first audio data ever that has been read from a BD after the BD has been loaded into the BD player. This point in time is synonymous with a point in time when the analyzer circuit 101 newly receives another audio data. Optionally, even while the content is being played back, the decision circuit 102 may monitor the contents of the control data either continuously or at regular intervals. And if the decision circuit 102 has sensed any variation in any of the parameters described above, the decision circuit 102 may carry out the decision processing step and determine the mixing coefficient group all over again. If the decision is made at these timings and sets the mixing coefficient group based on the control data, then the listener would never find unnatural the acoustic image of the audio to be reproduced after that.

In the example described above, four parameters are supposed to be used. However, this number is just an example.

Alternatively, it may also be determined, by using at least one of the four, whether or not any supplementary audio is included.

As described above, according to this preferred embodiment, the decision circuit 102 determines, based on the control data provided by the analyzer circuit 101, whether the input audio data includes any secondary audio data or sound effect data.

If the decision circuit 102 has decided that any of these two kinds of data be existent, then the decision circuit 102 sets the mixing coefficient group B (see Equations (7) and (8)), which contributes to maintaining the acoustic image orientation of the M-channel signals as well as possible even when the M-channel signals are mixed into N channels and which is stored in the coefficient memory circuit 108, for the mixer circuit 109. Otherwise, the decision circuit 102 sets the mixing coefficient group A (see Equations (1) and (2)), which is also stored in the coefficient memory circuit 108, for the mixer circuit 109. Based on the control data in the input data, the decision circuit 102 chooses one of multiple mixing coefficient groups prepared in advance and sets the chosen one for the mixer circuit 109. The mixing coefficient group can be set just by rewriting the respective mixing coefficients that have been retained in the mixer circuit 109. That is why this processing is simple enough and requires no bulky hardware. And if any secondary audio data or sound effect data is included, mixing coefficients that contribute to maintaining the acoustic image orientation and the directivity of its variation are set for the mixer circuit 109. As a result, an output audio signal, in which the secondary audio data or sound effect data has been mixed with the primary audio, can be obtained with the acoustic image orientation maintained well enough.

The audio mixing device of the present invention could be built in a read-only BD (i.e., BD-ROM) player or an HD-DVD player, for example. In that case, significant effects will be achieved because the original acoustic image orientation can be maintained as perfectly as possible even if any secondary audio or sound effect is mixed. Then, the viewer-listener can listen to the secondary audio (such as the voice of the movie director who moved the acoustic image intentionally by panning) and hear the sound effect (such as whistling sound) just as intended by the BD author. Naturally, the audio mixing device of the present invention could be built in a broadcaster's device, for example. If a content including M-channel audio signals is down-mixed into N channels (where M>N) and then broadcast, the receiver can reproduce the acoustic image orientation just as intended by the content producer even without requiring the receiver to perform any special kind of processing.

On top of that, the decision circuit 102 determines, based on the control data provided by the analyzer circuit 101, not the input signal itself, whether or not the input data includes any secondary audio data or sound effect data. That is why even if the property of the input signal changed suddenly, the mixer circuit 109 could still get mixing done successfully by performing the calculations by either Equations (1) and (2) or Equations (7) and (8). As a result, mixing can be done consistently and safely.

It should be noted that the processing described above does not always have to be performed. For example, if the user wants no mixing of secondary audio or sound effect, then only the normal mixing process represented by Equations (1) and (2) may be carried out. In that case, even if there is any secondary audio or sound effect that needs to maintain their acoustic image orientation perfectly but if such secondary audio or sound effect is not mixed, two-channel signals can be converted into multi-channel signals by getting down mixing processing done by an external device by performing the calculations represented by Equations (3) and (4). In the preferred embodiment described above, the decision circuit 102 is supposed to choose one of the two mixing coefficient groups A and B. However, as can be seen easily from the foregoing description, the number of mixing coefficient groups to choose one from does not have to be two but could be three or more. If the number of decision blocks shown in FIG. 6 is increased or if the number of their branches is increased to three or more, down mixing can get done more finely.

INDUSTRIAL APPLICABILITY

The audio mixing device of the present invention can be used effectively in any of various devices that have the function of reproducing supplementary audio and that need to change the numbers of output channels according to the specifications of the output device connected. Examples of such devices include general consumer electronic appliances such as BD-ROM players and HD-DVD players and broadcaster's equipment for business use.

The invention claimed is:

1. An audio mixing device comprising:

a primary audio decoder for decoding primary audio data into primary audio signals in multiple channels;

a supplementary audio decoder for decoding supplementary audio data into supplementary audio signals in multiple channels;

a decision circuit for determining, based on a decision of analysis of control data that indicates whether or not supplementary audio data is included, whether the supplementary audio data is included or not; and a mixer for generating an M-channel composite audio signal by adding the supplementary audio signals to the primary audio signals on a channel-by-channel basis and for converting the M-channel composite audio signal into N-channel audio signals, where N<M, based on either a first mixing coefficient group or second mixing coefficient group;

wherein the supplementary audio decoder is able to accept the supplementary audio data, of which the acoustic image orientation moves, and wherein the first and second mixing coefficient groups are set by the decision circuit so that the N-channel audio signals have an acoustic image orientation that is closer to the acoustic image orientation of the supplementary audio data when converted by the mixer using the first mixing coefficient group than when converted by the mixer using the second mixing coefficient group, and wherein if the decision circuit decides that the supplementary audio data be included, the mixer converts the composite audio signal into the N-channel audio signals using the first mixing coefficient group.

2. The audio mixing device of claim 1, wherein the mixer converts the composite audio signal into the N-channel audio signals using the second mixing coefficient group if the decision circuit decides that no supplementary audio data be included.

3. The audio mixing device of claim 1, further comprising an analyzer circuit for receiving input audio data that includes the primary audio data, the supplementary audio data and the control data, and for separating the input audio data into the respective kinds of data.

4. The audio mixing device of claim 1, wherein the supplementary audio data is at least one of secondary audio data and sound effect data and the control data indicates whether or not any secondary audio data or sound effect data is included, and wherein if the control data indicates that no secondary audio data or sound effect data is included, the decision circuit decides that no supplementary audio data be included.

5. The audio mixing device of claim 4, wherein the control data includes: a parameter indicating whether or not any file that stores the sound effect data is included; a flag indicating whether or not the supplementary audio data is included; a parameter indicating whether or not any interactive graphics is included; and a parameter indicating whether or not the secondary audio data is included in the supplementary audio data, and wherein the decision circuit decides that no supplementary audio data be included (a) if the flag indicating whether or not the supplementary audio data is included denies the existence of the supplementary audio data; or (b) if the flag indicating whether or not the supplementary audio data is included confirms the existence of the supplementary audio data, and if the parameter indicating whether or not any secondary audio data is included denies the existence of the secondary audio data, and if the parameter indicating whether or not any interactive graphics is included denies the existence of the interactive graphics; or (c) if the flag indicating whether or not the supplementary audio data is included confirms the existence of the supplementary audio data, and if the parameter indicating whether or not any secondary audio data is included denies the existence of the secondary audio data, and if the parameter indicating whether or not any file that stores the sound effect data is included denies the existence of the sound effect data.

6. The audio mixing device of claim 5, wherein if the parameter indicating whether or not any interactive graphics is included denies the existence of the interactive graphics, the decision circuit decides that no sound effect data be included, but if the parameter indicating whether or not the interactive graphics is included confirms the existence of the interactive graphics, the decision circuit decides that the sound effect data be included.

7. The audio mixing device of claim 4, wherein the control data include at least one of: a parameter indicating whether or not any file that stores the sound effect data is included; a flag indicating whether or not the supplementary audio data is included; a parameter indicating whether or not any interactive graphics is included; and a parameter indicating whether or not the secondary audio data is included in the supplementary audio data, and wherein if each said parameter of the control data indicates that no secondary audio data or sound effect data is included, the decision circuit decides that no supplementary audio data be included.

8. The audio mixing device of claim 3, wherein when the analyzer circuit receives the input audio data for the first time since the device has been turned ON, the decision circuit sets one of the first mixing coefficient group and the second mixing coefficient group for the mixer.

9. The audio mixing device of claim 3, wherein when the analyzer circuit newly receives another input audio data, the decision circuit sets one of the first mixing coefficient group and the second mixing coefficient group for the mixer.

* * * * *